United States Patent Office 3,557,562
Patented Jan. 26, 1971

3,557,562
METHOD OF FORMING A FLEXIBLE SEALANT
Homer C. McLaughlin, Jr., and Ronney R. Koch, Duncan, Okla., assignors to Halliburton Company, Duncan, Okla., a corporation of Delaware
No Drawing. Filed Jan. 31, 1968, Ser. No. 701,820
Int. Cl. E21b 33/14; E21d 5/00, 5/11
U.S. Cl. 61—41                                26 Claims

ABSTRACT OF THE DISCLOSURE

This invention relates to a flexible sealant. The sealant comprises an acrylamide monomer, a polyfunctional crosslinking agent such as an alkylene bisacrylamide, a hydrogen bonding solvent such as a glycol, a filler which will hydrogen bond to the solvent and to the polymerized acrylamide such as silica, and a catalyst which will polymerize the monomer. The sealant is particularly useful as a plug to prevent escape of radioactive material resulting from an underground explosion.

BACKGROUND OF THE INVENTION

Underground explosions and especially nuclear explosions have recently been carried out to study the characteristics of nuclear devices. Additionally, an underground explosion may be used to form a large underground cavity for storing materials such as natural gas and to melt and recover various materials which are normally mined by more conventional techniques.

In order to place the explosive charge into the ground, a hole must be drilled. The force of the shock wave is countered by filling the hole with gravel or a similar material. This stemming material is usually porous and does not prevent the escape of gases containing radioactive by-products of the nuclear explosion. Thus, in addition to the gravel, it is necessary to have a sealing material that will prevent the escape of radioactive materials and yet be flexible enough to withstand the shock wave. The sealant must also be easy to remove so that access to the explosion chamber can be readily obtained after the explosion has occurred.

The sealant should also be non-hydrocarbon so that it is inert to polyvinyl chloride and rubber which are used to insulate wires carrying instrumentation from the surface of the earth down the hole and into the test chamber. The sealant must be non-thermoplastic and must also have low inflammability because high temperatures are encountered. It must also have thermal properties such that the exotherm from the polymerization does not raise the temperature above 125° F. which would cause damage to the wires going through the sealant. Shrinkage must be at a minimum in order to preserve a tight seal. The gel time of the sealant must be long enough to allow for mixing and placement of the sealant and yet rapid enough so that there is not seepage into the lower gravel pack or bed. Finally, the sealant must have low galvanic action and the electrical resistivity should be at least about 50,000 ohm-centimeters to prevent absorbing of radio signals.

SUMMARY OF THE INVENTION

It is thus an object of the present invention to provide a flexible sealing material.

It is a further object of the present invention to provide a flexible sealing material which will not rupture when subjected to a shock wave.

A further object is to provide a flexible sealing material which has a high electrical resistivity.

Another object of the present invention is to provide a flexible sealing material which is inert to conventional wire insulation coverings.

These and further objects of the present invention will be readily understood by reference to the description and examples which follow.

Briefly, the invention comprises a flexible sealant comprising an acrylamide monomer, a crosslinking agent, a hydrogen bonding filler, a glycol, and a catalyst. This flexible sealant, when used to seal underground formations, provides a highly effective strong seal, resistant to shock and having a high electrical resistivity.

DESCRIPTION OF THE PREFERRED EMBODIMENTS

The flexible sealant of the present invention is obtained by polymerizing an acrylamide monomer in the presence of a polyfunctional crosslinking agent. Conventional catalysts and promoters are used in the polymerization. To the polymerized crosslinked acrylamide is added a hydrogen bonding solvent such as a glycol or an alcohol and a hydrogen bonding filler such as silica. This mixture is introduced into the cavity to be sealed and then polymerized.

The monomer used in the flexible sealant polymerizes to thicken the sealant mixture until it approaches a gel. It is important that the monomer be one which exhibits hydrogen bonding in order to produce the necessary flexibility. Especially suitable monomers are the acrylamide monomers described in Koch U.S. Pat. 3,223,163 and having the structure

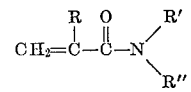

where R is either H or $CH_3$, R' is either H or an alkyl group, and R" is either H or an alkyl group. Although acrylamide and substituted acrylamides are preferred, many other monomers are suitable in practicing the present invention. Other monomers include those listed in Roth U.S. Pat. 2,801,985, Morgan U.S. Pat. 2,801,984 and Rakowitz U.S. Pat. 2,940,729, which do not ionize significantly in a polyol solvent and which are soluble in a polyol solvent. The disclosures of the four above-mentioned patents are incorporated herein by reference. In general, the amount of monomer may vary from about 2% to about 25% by weight of the mixture.

In order to form a gel, it is necessary to include a crosslinker for the monomer. In general, any polyfunctional monomer such as polyethylenic compounds may be used. A preferred crosslinking material is N,N'-methylenebisacrylamide. Other crosslinking materials which may be used in place of the N,N'-methylenebisacrylamide are disclosed in Roth U.S. Pat. 2,801,985, Morgan U.S. Pat. 2,801,984 and Rokawitz U.S. Pat. 2,940,729. In addition, other crosslinking materials such as triallyl phosphate, diallylfumarate, etc., wherein there are seven or more atoms in the chain between the double bonds of these polyfunctional crosslinking agents, may be employed. Additionally, other compounds which do not fit into this category may also be used. Typical of such compounds are N,N-diallylacrylamide. Such compounds are disclosed in McLaughlin U.S. Pat. 3,334,689, the disclosure of which is hereby incorporated into this application by reference. The amount of crosslinking agent should be sufficient to form a gel and generally may vary from about 0.001% to about 5% by weight of the mixture.

A polymerization initiator for the monomer such as a peroxide is included in the mixture. Exemplary of suitable peroxide catalysts are tertiary-butyl hydroperoxide, a mixture of 70% tertiary-butyl hydroperoxide and 30% di-tert-butyl peroxide, methylethyl ketone peroxide, ammonium persulfate, and benzoyl peroxide. In general, any polymerization initiator for the monomer may be used.

It is preferred that a promoter which aids the peroxide in curing the catalyst also be included in the mixture. A preferred promoter is cobalt acetate although other ions than acetate may be used since cobalt is the active moiety. In addition, other metals such as manganese, chromium, iron, vanadium, platinum, lead, etc., may be used. Other redox promoters such as N,N-dimethylaniline may be used in place of or in conjunction with the metal promoter.

As a safety precaution and to avoid a possible explosion, the initiator and the promoter should be mixed separately in the sealant mixture. Mixing together of the initiator and the promoter should be avoided.

Both the promoter and catalyst are present in catalytically effective amounts. In general, the catalyst is present in an amount from about 0.1% to 5% by weight of the mixture whereas the promoter may be present in an amount of from about 0.001% to 5% by weight of the mixture.

An important component of the sealant is a hydrogen bonding filler which increases the toughness and flexibility of the sealant, Additionally, it increases the electrical resistivity, prevents invasion of sealant into the gravel, reduces the carbon content and increases the strength of the sealant. The preferred filler is a finely ground silica. The particle size of the silica may range from about 140 through 325 standard U.S. sieve mesh. A size in the range of from about 200 to 270 mesh is preferred. However, it may also be desirable to include part of the filler having a larger particle size, e.g., 20 to 160 standard U.S. sieve mesh. This corresponds to sand which is essentially silica. The larger particle size functions in the same manner except that it has a greatly reduced surface area and thus bulks up the sealant without unduly raising its viscosity. In addition to silica, other fillers which are non-ionic, non-conducting hydrogen bonding materials such as wood flour, bauxite, talc and scoria, may be used. In general, the amount of filler can range from about 0% to 70% by weight of the mixture. Preferably, the mixture should contain at least about 50% by weight of the filler.

An important component of the mixture is a hydroxyl containing organic material. This hydroxyl containing material makes the mixture inert to rubber and other insulating materials for electrical wires which may pass through the flexible sealant. Additionally, the hydoxyl containing material increases the electrical resistance of the sealant. Polyols such as ethylene glycol and glycerol are preferred. In addition, other polyols such as diethylene glycol, triethylene glycol, and other glycols in this series to polyethylene glycol may be used. Also, the homologous series ethylene glycol, glycerol, through the hexane hexols such as sorbitol and manitol may be used. Additional polyols include sucrose, dextrose, starches, gums, polyvinyl alcohol telomers, propylene glycol, 1,4-butene diol, etc. Monohydroxy alcohol such as ethanol, 2-propanol, etc., may also be used but are not in the preferred class since they may involve a fire hazard in their use. The hydroxyl containing compound should be present in an amount of about 5% to about 95% by weight of the mixture.

An important use of the flexible sealant is as a part of the stemming material filling the access shaft of a chamber in which a high shock wave and pressure are generated. A typical use is in the access shaft for an underground explosion such as an underground nuclear explosion. Underground nuclear explosions may be used to determine the explosive characteristics of the nuclear device to form a large underground cavern, or in connection with recovery of underground oil, minerals, etc. The test chamber in which the explosion occurs is usually connected to the surface of the earth by a long shaft. Especially in the case of the nuclear explosions, it is important to prevent the escape of the radioactive by-products of the nuclear explosion. The force of the shock wave is countered by filling the access shaft with gravel or some other material. However, this filling or stemming material is normally porous and will not prevent the escape of gases bearing radioactive materials. Thus, in addition to the gravel or other filling material, it is necessary that there be a sealing material which will not allow gases to escape. The sealing material must be flexible so that it is not fractured by the shock waves.

An important use of the sealing material of the present invention is in the sealing of an access shaft to an underground explosion chamber. A typical arrangement for an underground explosion includes a mined out chamber formed below the surface of the earth in which a nuclear explosive is inserted. Various wires or other sensing means are normally present in the chamber to monitor the results of the explosion. These wires are carried to the surface of the earth by means of insulated cables. A vertical access shaft connects the explosion chamber with the surface of the earth and provides a passage for the wires. In order to prevent the force of the explosion from being directed out the access shaft, the access shaft is normally filled with gravel or similar material to stem the shock wave. Since the gravel-type material is porous and thus will not prevent the escape of gases carrying radioactive materials, a sealant is necessary.

Normally, the solvent is placed in the access shaft with gravel both above and below it. Preferably, the height of the column of sealant is at least about 20 feet and may be as much as 200 feet. In sealing the access shaft, gravel is first put in place in the lower portion of the shaft. Then the unpolymerized sealant material is mixed and poured into the shaft. The mixture at once begins to polymerize and after a given amount of time will polymerize and crosslink to form the sealing gel. The gelling time is varied by varying the concentration of monomer, crosslinker and catalyst. After the sealant has polymerized, the remainder of the shaft may be filled up with gravel. At the time the unpolymerized sealant is introduced into the shaft, it has a sufficient viscosity due to the presence of the filler material so that it does not diffuse into the lower bed of gravel but instead stays in a confined area above the gravel bed.

Another use of the sealing material of the invention is filling voids in the wall around a missile silo. The missile silo comprises a hole which has been drilled in the ground and a steel casing which is placed into the hole and bonded to the walls of the hole. Voids may be present in the formation and also between the formation and the cement. It is preferred that the material filling the voids have a high electrical resistance so that it does not interfere with radio signals. To fill these voids, the flexible sealant of the present invention is introduced into the formation using conventional grouting techniques. If the pores into which the sealant is introduced are extremely fine, it may be necessary to eliminate the filler from the composition. Elimination of the filler will, of course, reduce the flexibility and shock resistance of the sealant but the formation itself will function as a filler to some extent.

Another application of the flexible sealant is to form gaskets or belts in the annulus between a well casing and the hole. The gaskets find use in wells wherein the casing is expected to move. Movement of the casing may be caused by thermal expansion and contraction in a secondary steam injection well in an oil field, because of high thermal stresses from other sources, because of mechanical stresses, etc. The stress on the casing is likely to break the brittle bond between the cement and the casing. This will defeat one of the primary purposes of the cement, the prevention of water circulation up and down in the annular space between the casing and the formation. When used in steam injection wells, direct contact of the sealant with steam should be avoided.

When gaskets or belts of flexible sealant are placed in the annulus between sections of conventional cement, any water seepage will encounter the flexible sealant belt as the water attempts to travel up and down the annular space. The bond between the casing and the flexible sealant will not be broken due to the flexibility of the sealant and thus further migration of the water will be prevented. Also, in the event that the sealant is broken, it will tend to swell in the water and effectively plug any water channels which might have existed.

The gaskets or belts of flexible sealant in the casing-formation annulus may be formed by introducing a volume of sealant between volumes of cement during the cementing operation. The amount of sealant should be such that it will form an annular belt about 5 to 1000 feet high and preferably about 20 to 100 feet high.

The present invention may be more fully understood by reference to the following examples.

Example 1

This example illustrates the properties of various compositions within the scope of the invention. The formulations and properties tested are set forth in Table I below.

internal diameter of 4.78 inches and cured. Tests were made with bare pipe and pipe wherein the inner surface was coated with a material to improve the bond between the sealant and the pipe. Sand was placed in the pipe above the sealant and a mud containing 500 ml. of water, 43.25 grams of bentonite, and 791 grams of barite was placed above the sand. Sand was placed in the pipe below the sealant. The shock wave of a nuclear explosion was simulated by attaching pressure lines to both ends of the test device and simultaneously subjecting both ends to an air pressure of 1500 p.s.i.g. In all cases, the sealant withstood this shock without rupture. The pressure was then bled off and 24 p.s.i.g. air pressure was retained on the top of the assembly for 40 days. After this, the pressure was increased by stages until the sealant extruded from the bottom of the tube or ruptured. This second phase of the testing involving subjecting the top of the sealant to pressure was intended to simulate pressures of the atmosphere and the gravel column on the sealant after the explosion. The two formulations tested are set forth

TABLE I

| Formulation percent, by wieght | A | B | C | D | E | F |
|---|---|---|---|---|---|---|
| Ethylene glycol | 18.10 | 18.10 | 7.77 | 7.65 | 30.20 | 42.23 |
| Glycerol | 20.30 | 20.30 | 25.83 | 25.43 | 0 | 41.79 |
| N,N'-methylenebisacrylamide | 0.05 | 0.10 | 0.06 | 0.04 | 0.24 | 0.75 |
| Acrylamide | 5.45 | 5.40 | 3.09 | 4.62 | 4.60 | 14.18 |
| Polyacrylamide | 0.2 | 0.2 | 0 | 0 | 0.16 | 0.50 |
| Cobalt acetate | 0.024 | 0.024 | 0.020 | 0.019 | 0.02 | 0.060 |
| t-BH-70 | 0.2 | 0.2 | 0.16 | 0.16 | 0.16 | 0.50 |
| Silica, 270 mesh | 55.7 | 55.7 | 31.53 | 31.53 | 64.61 | 0 |
| Sand, 70-140 mesh | 0 | 0 | 31.53 | 31.53 | 0 | 0 |
| Miscellaneous properties: | | | | | | |
| Viscosity, cp | 1,500 | 2,300 | 3,500 | 3,000 | 430 | 755 |
| Weight, lbs./gal | 14.17 | 14.20 | 15.30 | 15.15 | 14.76 | 9.77 |
| Shrinkage, percent [1] | 0.8 | 0.8 | 0.8 | 0.7 | (2) | (2) |
| Gel time, minutes | 50 | 55 | 60 | 55 | 47 | 90 |
| Net exotherm, °F | 56 | 57 | 43 | 57 | 56 | 83 |
| Compressive strength: | | | | | | |
| Stress, p.s.i | 500 | 527 | 231 | 322 | (2) | (2) |
| Strain, percent | 87 | 82 | 82 | 82 | (2) | (2) |
| Tensile strength: | | | | | | |
| Stress, p.s.i | 16.8 | 14.9 | 6.2 | 15.5 | (2) | (2) |
| Elongation, percent | 332 | 151 | 113.8 | 255 | (2) | (2) |
| Extrusion, p.s.i.[3] | 3,500 | 1,800 | 1,000 | 3,500 | (2) | (2) |
| Bond strength: | | | | | | |
| Iron, p.s.i | (2) | 35.7 | 7.9 | 12.3 | (2) | (2) |
| Polyvinyl chloride, p.s.i | 1.26 | 2.92 | 0.86 | 1.06 | (2) | (2) |
| Resistivity, ohm-cm | $5\times10^5$ | $5.3\times10^5$ | $1.3\times10^6$ | $1.6\times10^6$ | $5.2\times10^4$ | $5.85\times10^4$ |
| Galvanic corrosion [4] | 0.121 | 0.404 | 0.183 | 0.229 | (2) | (2) |

[1] Linear, over a distance of 4 feet.
[2] Not tested.
[3] From a 4 foot length of nominal 1 inch pipe.
[4] Volts potential Fe/Cu.

Example 2

This example illustrates how gel time can be controlled by varying the amount of catalyst, tertiary-butyl hydroperoxide. A mixture of sealant was prepared having the proportions set forth in the table below. The weight percentage of the catalyst was varied from 0.037 to 0.186 and the time for the gel to form was recorded. The results are set forth in Table II below.

TABLE II

| Ingredients: | Percent by weight |
|---|---|
| Ethylene glycol | 18.1. |
| Glycerol | 20.3. |
| N,N'-methylenebisacrylamide | 0.09. |
| Acrylamide | 5.66. |
| Cobalt acetate | 0.06. |
| t-BH-70 | As listed below. |
| Silica (about 270 mesh) | 55.68. |

| t-BH-70, percent by weight: | Gel time, minutes |
|---|---|
| 0.186 | 54 |
| 0.149 | 63 |
| 0.112 | 75 |
| 0.074 | 85 |
| 0.037 | 131 |

Example 3

This example illustrates the resistance to shock and pressure of the flexible sealant. Two sealants having the compositions set forth below were tested. The sealant being tested was placed into a pipe 5 feet long with an below in Table III and the test results are set forth in Table IV.

TABLE III

| Formulation and chemicals used: | Percent by weight |
|---|---|
| Formula X: | |
| Glycol | 7.67 |
| Glycerol | 25.82 |
| PWG | 1.10 |
| Acrylamide | 2.05 |
| 12% cobalt acetate [1] | 0.16 |
| t-BH-70 | 0.16 |
| WAC-9 | 31.53 |
| Oklahoma No. 1 sand | 31.53 |
| Total | 100.2 |
| Formula Y: | |
| Glycol | 7.51 |
| Glycerol | 25.43 |
| PWG | 0.78 |
| Acrylamide | 3.88 |
| 12% cobalt acetate [1] | 0.16 |
| t-BH-70 | 0.16 |
| WAC-9 | 31.05 |
| Oklahoma No. 1 sand | 31.05 |
| Total | 100.2 |

[1] This is a solution of 12 gms. cobalt acetate in 88 gms. glycol.

TABLE IV

| Pressure, p.s.i.g. | Formula X Uncoated [1] | Formula X Coated [2] | Formula Y Uncoated [1] | Formula Y Coated [2] |
|---|---|---|---|---|
| 55 | 0 | | Trace | |
| 60 | 0 | | 0.3750 | |
| 65 | 0 | | 0.4375 | |
| 70 | 0 | 0 | 0.4375 | |
| 75 | 0 | | 0.500 | 0 |
| 80 | 0 | | | |
| 85 | 0 | | | |
| 90 | | 0 | 0.5625 | |
| 100 | 0 | 0 | 0.5937 | 0 |
| 120 | 0 | | 0.625 | |
| 125 | | | | 0 |
| 140 | 0.0625 | | 0.6875 | |
| 150 | | 0 | | 0 |
| 160 | 0.125 | | 0.8125 | |
| 175 | | | | Trace |
| 180 | 0.1875 | | 1.00 | |
| 200 | Extruded | 0 | 1.0625 | 0.500 |
| 220 | | | 1.250 | |
| 225 | | | | 1.00 |
| 240 | | | 1.3750 | |
| 250 | | 0.500 | | 1.00 |
| 260 | | | 1.500 | |
| 275 | | 0.750 | | 1.00 |
| 280 | | | 1.6250 | |
| 300 | | 1.00 | 1.750 | 1.00 |
| 320 | | | 2.000 | |
| 325 | | 1.250 | | 1.250 |
| 350 | | 2.00 | | 1.250 |
| 375 | | | | 1.250 |
| 400 | | | | 1.500 |
| 425 | | | | 1.500 |
| 450 | | | | Curl |
| 475 | | | | Curl |
| 500 | | | | Curl |
| 525 | | | | Curl |
| 550 | | | | Rupture |

[1] Steel walls only.
[2] The walls are coated with Casing-Kote.

Example 4

This example describes an application of a flexible sealant having the composition set forth as Formula X in Table III. The sealant was used to seal the excess shaft during detonation of a 26 kiloton nuclear device at approximately 4250 feet below ground level to stimulate the geological formation known as the Pictured Cliffs formation. The detonation was carried out under the name Project Gasbuggy. The Pictured Cliffs formation contained natural gas. However, the formation porosity is unfavorable for commercial production of the gas. The gas is locked so tightly that normal production stimulation techniques such as nitroglycerin shock or hydraulic fracturing are not significantly effective. The explosion at the base of Pictured Cliffs formation was designed to produce a 160 foot diameter by 350 foot high cavern filled with crushed sandstone rubble from the formation. Fractures and cracks are likely to radiate in excess of 650 feet from the blast center.

A mixture was prepared to seal radioactive gas in the implacement hole in the following sequence; ethylene glycol, 891 pounds; glycerol, 2960 pounds; cobalt acetate, 2¼ pounds; acrylamide, 240 pounds; PWG, 127.5 pounds; 260 mesh silica (silica flour), 3600 pounds; Oklahoma No. 1 sand, 3600 pounds; and 70% tertiary butyl hydroperoxide, 18.1 pounds. The total volume was approximately 750 gallons. PWG is a commercial brand of 95% acrylamide and 5% methylene bisacrylamide. The ambient temperature was about 10° F. so the glycol and glycerol were added to the 1200 gallons capacity ribbon blender prior to transporting to the work site in order to avoid the high viscosity of cold glycerol. Before adding the solid materials, the glycol-glycerol solution was heated by pump circulation to 65° F. This heat facilitated dissolving the solubles and slurrying the insolubles. At the finish of mixing, the sealant slurry was at a temperature of 58° F. The sealant slurry was then pumped into the implacement hole at a rate of 0.72 barrel per minute. About 610 gallons of the slurry was used to fill the hole 51 feet to the surface on top of a Portland cement floodback. The slurry set to a rubbery solid in about 2 hours. The device was detonated approximately 25½ hours after the sealant was introduced.

The sealant allowed no radioactive gases to vent to the atmosphere. There was some gas leakage from the cavern through the interior of the cables, but this was not within the responsibility of the flexible sealant.

It can be seen that the present invention is applicable to a wide variety of uses where a flexible sealant having a low resistivity and a high resistance to shock and pressure is desired. Furthermore, the composition of the sealant may be varied widely within the guide lines set forth above. Thus, it should be understood that the above examples are merely illustrative and should not be considered as limiting the scope of the invention. The scope of the invention is limited only by the lawful scope of the appended claims which follow.

We claim:

1. A method of forming a flexible sealant in a void contained in an earth formation comprising injecting into the void a composition comprising a monomer which will form a polymer capable of hydrogen bonding, a polyfunctional crosslinking agent for said polymer, a hydroxyl containing organic compound and a polymerization catalyst for said monomer.

2. The method of claim 1 wherein said crosslinking agent is N,N'-methylenebisacrylamide.

3. A method of forming a flexible sealant in a void contained in an earth formation comprising injecting into the void a composition comprising a monomer which will form a polymer capable of hydrogen bonding, a polyfunctional cross-linking agent for said polymer, an organic polyol and a polymerization catalyst for said monomer.

4. The method of claim 3 wherein said composition is introduced into a void connecting an underground chamber, wherein an explosion is to be detonated, with the surface of the earth.

5. The method of claim 4 wherein the composition is placed between layers of gravel in said void.

6. The method of claim 4 wherein electrical cables connecting the explosion chamber with the surface of the earth, are encased by said sealant.

7. The method of claim 4 wherein portland cement is first introduced into said void and then said composition is injected into said void.

8. The method of claim 3 wherein said composition is injected into the voids in the wall around a casing.

9. The method of claim 8 wherein said casing is a missile silo.

10. The method of claim 3 wherein said composition is injected into a casing-formation annulus to form annular sections of a flexible sealant between a casing and a formation wall.

11. The method of claim 10 wherein said composition and cement are introduced into a casing-formation annulus whereby alternating annular sections of cement and said composition are formed in said casing-formation annulus.

12. The method of claim 3 wherein the monomer is an acrylamide having the formula

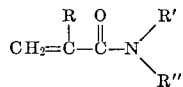

wherein R is either H or $CH_3$, R' is either H or an alkyl group and R" is either H or an alkyl group.

13. The method of claim 3 wherein the polyol is selected from the group consisting of ethylene glycol, glycerol, sorbital and mixtures thereof.

14. The method of claim 13 wherein the polyol is ethylene glycol.

15. The method of claim 13 wherein the polyol is glycerol.

16. The method of claim 13 wherein the polyol is sorbitol.

17. The method of claim 13 wherein the polyol is a mixture of ethylene glycol and glycerol.

18. The method of claim 13 wherein the polyol is a mixture of ethylene glycol and sorbitol.

19. The method of claim 3 wherein said monomer is acrylamide.

20. The method of claim 3 wherein said catalyst is a peroxide.

21. The method of claim 3 wherein said catalyst is a tertiary butyl hydroperoxide.

22. The method of claim 3 wherein the composition contains a filler which will form hydrogen bonds with said polymer.

23. The method of claim 22 wherein said filler is selected from the group consisting of silica, wood flour, bauxite, talc, scoria and mixtures thereof.

24. The method of claim 23 wherein said filler is silica.

25. The method of claim 3 wherein said composition comprises from about 2% to about 25% by weight of an acrylamide monomer having the structure

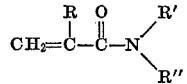

wherein R is either H or $CH_3$, R' is either H or an alkyl group and R" is either H or an alkyl group, from about 0.1% to about 5% by weight of a polyfunctional monomer capable of crosslinking the polymer formed from said acrylamide monomer, a polymerization initiator for said acrylamide monomer, from about 0% to about 70% by weight of a filler which will form hydrogen bonds with polymer of said acrylamide monomer and from about 5% to about 95% by weight of a polyol.

26. The method of claim 3 wherein said composition includes a promoter selected from the group consisting of compounds of cobalt, manganese, chromium, iron, vanadium, platinum, lead and mixtures thereof.

References Cited

UNITED STATES PATENTS

| | | | |
|---|---|---|---|
| 3,044,548 | 7/1962 | Perry et al. | 166—33 |
| 3,070,163 | 12/1962 | Colby et al. | 166—33 |
| 3,303,881 | 2/1967 | Dixon | 166—36 |
| 3,307,361 | 3/1967 | Waterman | 61—41 |
| 3,336,979 | 8/1967 | Ingraham et al. | 166—33 |
| 3,342,257 | 9/1967 | Jacobs et al. | 166—36 |
| 3,374,834 | 3/1968 | Ramos et al. | 166—33 |
| 3,421,584 | 1/1969 | Eilers et al. | 166—33 |

OTHER REFERENCES

The Condensed Chemical Dictionary, 6th edition, Reinhold Publishing Co., New York, N.Y., 1961, p. 186 relied on.

STEPHEN J. NOVOSAD, Primary Examiner

U.S. Cl. X.R.

166—295; 260—33.4